United States Patent
Sano et al.

(10) Patent No.: US 9,880,055 B2
(45) Date of Patent: Jan. 30, 2018

(54) SPECTROSCOPIC IMAGING APPARATUS AND SPECTROSCOPIC IMAGING METHOD

(71) Applicant: Seiko Epson Corporation, Tokyo (JP)

(72) Inventors: Akira Sano, Shiojiri (JP); Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/751,785

(22) Filed: Jun. 26, 2015

(65) Prior Publication Data
US 2015/0377706 A1    Dec. 31, 2015

(30) Foreign Application Priority Data
Jun. 30, 2014    (JP) ................................ 2014-134838

(51) Int. Cl.
*G01J 3/28*    (2006.01)
*G01J 3/26*    (2006.01)

(52) U.S. Cl.
CPC ............. *G01J 3/2823* (2013.01); *G01J 3/26* (2013.01)

(58) Field of Classification Search
CPC .... G01J 3/2823; G01J 3/26; G01J 3/45; G01J 3/0216; G01J 9/0246; G02B 26/001; G02B 5/284; G01L 39/02044
USPC ............................................... 356/454, 456
See application file for complete search history.

(56) References Cited

U.S. PATENT DOCUMENTS

| | | | |
|---|---|---|---|
| 5,461,477 A * | 10/1995 | Marinelli | G01J 3/2823 250/343 |
| 8,130,380 B2 | 3/2012 | Saari | |
| 8,289,520 B2 | 10/2012 | Kraus et al. | |
| 8,786,861 B2 | 7/2014 | Funamoto | |
| 2003/0058520 A1* | 3/2003 | Yu | G01J 3/021 359/291 |
| 2004/0013356 A1* | 1/2004 | Wang | G02B 6/29358 385/27 |

(Continued)

FOREIGN PATENT DOCUMENTS

| | | |
|---|---|---|
| JP | 04-125429 A | 4/1992 |
| JP | 2000-162043 A | 6/2000 |

(Continued)

OTHER PUBLICATIONS

Amnon Yariv, Basis of Optical Electronics, 5th Edition, published in Japan by Maruzen Inc. on Sep. 15, 1982, pp. 57-60.

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

A spectroscopic camera is provided with a pair of reflecting films, and a wavelength variable interference filter including an electrostatic actuator which can change a size of the gap between the pair of reflecting films, an imaging unit which includes a plurality of pixels which is disposed in a two-dimensional array structure, and receives the light transmitted to the wavelength variable interference filter, and a received-light wavelength acquiring unit which acquires a central wavelength of the light which is incident on the pixel with respect to each of the pixels in the imaging unit, in which the received-light wavelength acquiring unit acquires the central wavelength based on an incidence angle in a position where the light which is received in each of the pixels is incident to the pair of reflecting films.

10 Claims, 12 Drawing Sheets

(56) References Cited

U.S. PATENT DOCUMENTS

| | | | |
|---|---|---|---|
| 2005/0046837 A1* | 3/2005 | Izumi | G01J 3/18 356/326 |
| 2009/0009945 A1 | 1/2009 | Johnson et al. | |
| 2010/0208257 A1 | 8/2010 | Shibayama et al. | |
| 2010/0245832 A1 | 9/2010 | Saari | |
| 2011/0117025 A1 | 5/2011 | Dacosta et al. | |
| 2012/0109584 A1 | 5/2012 | Urushidani | |
| 2012/0307241 A1 | 12/2012 | Maity et al. | |
| 2012/0320340 A1 | 12/2012 | Coleman, III | |
| 2013/0229646 A1 | 9/2013 | Sakurai | |
| 2014/0092492 A1 | 4/2014 | Topliss | |
| 2014/0354802 A1 | 12/2014 | Ohtomo et al. | |
| 2014/0375996 A1 | 12/2014 | Urushidani | |
| 2015/0029604 A1 | 1/2015 | Chalenko | |
| 2015/0086117 A1 | 3/2015 | Comstock, II et al. | |
| 2016/0045114 A1 | 2/2016 | Dacosta et al. | |

FOREIGN PATENT DOCUMENTS

| | | |
|---|---|---|
| JP | 2000-206037 A | 7/2000 |
| JP | 2000-266605 A | 9/2000 |
| JP | 2001-221686 A | 8/2001 |
| JP | 2001-296180 A | 10/2001 |
| JP | 2006-303955 A | 11/2006 |
| JP | 2009-210312 A | 9/2009 |
| JP | 2010-085408 A | 4/2010 |
| JP | 2010-271246 A | 12/2010 |
| JP | 2011-002376 A | 1/2011 |
| JP | 2011-521237 A | 7/2011 |
| JP | 2012-093275 A | 5/2012 |
| JP | 2012-103208 A | 5/2012 |
| JP | 2013-033006 A | 2/2013 |
| JP | 2013-109055 A | 6/2013 |
| JP | 2013-170867 A | 9/2013 |
| JP | 2013-181912 A | 9/2013 |
| JP | 3185803 U | 9/2013 |
| JP | 2014-035190 A | 2/2014 |

* cited by examiner

FIG. 10

| GAP SIZE $d_A$ | PIXEL | | | | |
|---|---|---|---|---|---|
| | $(x_1, y_1)$ | ... | $(x_m, y_l)$ | ... | $(x_M, y_L)$ |
| d1 | $\lambda_{111}$ | ... | $\lambda_{ml1}$ | ... | $\lambda_{ML1}$ |
| d2 | $\lambda_{112}$ | ... | $\lambda_{ml2}$ | ... | $\lambda_{ML2}$ |
| ... | ... | ... | ... | ... | ... |
| dj | $\lambda_{11j}$ | ... | $\lambda_{mlj}$ | ... | $\lambda_{MLj}$ |
| ... | ... | ... | ... | ... | ... |
| dmin | $\lambda_{11-min}$ | ... | $\lambda_{ml-min}$ | ... | $\lambda_{ML-min}$ |

SPECTROSCOPIC IMAGING APPARATUS AND SPECTROSCOPIC IMAGING METHOD

BACKGROUND

1. Technical Field

The present invention relates to a spectroscopic imaging apparatus and a spectroscopic imaging method.

2. Related Art

In the related art, a spectroscopic imaging apparatus that images a spectroscopic image by causing light to be incident on a Fabry-Perot etalon (a wavelength variable interference filter), and light having a predetermined wavelength to be transmitted so as to be imaged with an imaging element is known (for example, refer to JP-A-2000-162043).

In the wavelength variable interference filter, the light is transmitted in response to a size of the gap between the reflecting films which are a pair of reflecting films facing each other. Accordingly, when the light is incident with respect to the pair of reflecting films at different angles, an optical distance for each of the reflecting films becomes differentiated, and thus light beams having different wavelengths from each other are transmitted. For this reason, in the apparatus disclosed in JP-A-2000-162043, an optical fiber plate is disposed on a prestage and a poststage of the wavelength variable interference filter, and then an incidence angle of the light incident on the wavelength variable interference filter is set to be orthogonal to the reflecting film and set as parallel rays. With this, the incidence angle of the light incident on the wavelength variable interference filter is set such that the light having a desired wavelength is transmitted and thus a spectroscopic image having the aforementioned wavelength is imaged.

Incidentally, in the apparatus disclosed in JP-A-2000-162043, there is a concern in that the optical fiber plate is disposed on the prestage and a poststage of the wavelength variable interference filter, and thus an optical system becomes larger. Particularly, in recent years, a portable imaging device, which is compact and thin, such as a cell phone, a smart phone, or a digital camera has become common, and it is desired to mount an optical module in which the wavelength variable interference filter is incorporated on the above-described imaging device so as to image a spectroscopic image. However, as described above, if an incident optical system for setting the incidence angle of the light incident on the wavelength variable interference filter is incorporated in the optical module, not only does the optical module become larger, but also the imaging device on which the optical module is mounted becomes larger, thereby deteriorating portability.

SUMMARY

An advantage of some aspects of the invention is to provide a spectroscopic imaging apparatus with a compact size and excellent performance, and a spectroscopic imaging method.

According to this application example, there is provided an imaging unit that includes a plurality of pixels, and receives light guided by a light condensing unit; a wavelength variable interference filter that includes a pair of reflecting films and a gap changing unit which is able to change a size of the gap between the pair of reflecting films, and is disposed on an optical path of the light incident on the imaging unit; and a received-light wavelength acquiring unit that acquires a central wavelength of the light which is incident on each of the plurality of pixels, in which the received-light wavelength acquiring unit acquires the central wavelength based on an incidence angle in a position where the light which is received in each of the plurality of pixels is incident to one among the pair of reflecting films.

The plurality of pixels may be disposed in a two-dimensional array structure.

In the application example, a captured image is acquired by receiving the light, which is transmitted to the wavelength variable interference filter, in each pixel of the imaging unit. At the same time, the received-light wavelength acquiring unit acquires the central wavelength based on an incidence angle in a position where the light is incident to the reflecting film, with respect to the pixel.

Here, the light received in the pixel is incident on the pair of reflecting films of the wavelength variable interference filter on the optical path at a certain incidence angle, and receives multiple interferences in an optical distance, which corresponds to the incidence angle, between the pair of reflecting films, and thereafter, the light of the selected wavelength is transmitted so as to be received in the pixel. That is, the light incident on the pixel is the light of a predetermined wavelength corresponding to the size of the gap and the incidence angle. In this application example, it is not necessary to provide an optical member for setting the incidence angle of the incident light in the prestage of the wavelength variable interference filter, and thus it is possible to provide a compact-sized spectroscopic imaging apparatus. In addition, since it is possible to acquire the central wavelength of the light incident on each pixel through the received-light wavelength acquiring unit, a spectroscopic image having high accuracy can be acquired.

In the spectroscopic imaging apparatus according to the application example, it is preferable that the received-light wavelength acquiring unit calculates the central wavelength of the light which is received in a predetermined pixel based on a distance between the imaging unit and the light condensing unit, and a distance between a pixel among the plurality of pixels which is disposed in the middle of the imaging unit and the predetermined pixel among the plurality of pixels.

In the application example, the central wavelength of the light which is received in a predetermined pixel is calculated based on a distance L between the light condensing unit and the imaging unit and a distance X between the pixel disposed in the middle of the imaging unit and the predetermined pixel. A wavelength $\lambda$ of the light which is transmitted to the wavelength variable interference filter is calculated by using a refractive index n of a medium between the reflecting films, a size of the gap d between the reflecting films, and a degree m, as well as an incidence angle $\varphi$ of the light incident on the pair of the reflecting films.

In addition, by using the distances L and x, it is possible to easily calculate the incidence angle of the light incident on the reflecting film with a simple trigonometric function. Further, these distances L and x are specific known values of the apparatus. Accordingly, the received-light wavelength acquiring unit can easily calculate the wavelength $\lambda$ of the light incident on each pixel.

In the spectroscopic imaging apparatus according to the application example, it is preferable that the received-light wavelength acquiring unit calculates a distance between the imaging unit and the light condensing unit based on the incidence angle corresponding to the light incident on the pixel which is disposed at the outermost periphery of the imaging unit by the light condensing unit, and a distance between the pixel disposed in the middle of the imaging unit and the pixel which is disposed at the outermost periphery of the imaging unit.

In this application example, the above described distance is calculated based on the incidence angle θ of the incident light with respect to the light incident on the pixel which is disposed at the outermost periphery of the imaging unit, and the distance X between the pixel disposed in the middle of the imaging unit and the pixel which is disposed at the outermost periphery. Here, the incidence angle θ is a field angle in a camera, and is a known value which is set to a normal imaging device in advance.

In this application example, even in a case where the distance L between the light condensing unit and the imaging unit is not clear, it is possible to easily calculate the distance L based on the field angle θ and the distance X as described above. Therefore, similar to in the above-described invention, it is possible to easily calculate the central wavelength of the light which is incident on each of the pixels.

In the spectroscopic imaging apparatus according to the application example, it is preferable to include a storage unit that stores table data in which the central wavelength of the light which is incident on each of the plurality of pixels is recorded so as to correspond to each of a plurality of sizes of the gap, in which the received-light wavelength acquiring unit acquires the central wavelength of the light which is received in each of the plurality of pixels based on the table data.

In this application example, the received-light wavelength acquiring unit acquires the central wavelength of the light which is received in each of the pixels based on the table data stored in the storage unit. That is, the received-light wavelength acquiring unit acquires the size of the gap between the pair of reflecting films, which is changed by the gap changing unit, and acquires the central wavelength of the light which is received in each of the pixels from the table data corresponding to the size of the gap. In this case, the process of calculating the central wavelength as in the above described invention is not necessary, and thus it is possible to easily acquire the central wavelength of the light which is received in each of the pixels. In addition, even in a case where the central wavelength with respect to the corresponding size of the gap is not recorded in the table data, it is possible to easily perform an interpolating process.

In the spectroscopic imaging apparatus according to the application example, it is preferable that the received-light wavelength acquiring unit acquires the central wavelength based on the size of the gap and the incidence angle in a position where the light which is received in each of the plurality of pixels is incident to one among the pair of reflecting films.

In this application example, the central wavelength is acquired based on not only the incidence angle of the light incident on the pair of reflecting films as in the above-described invention but also the size of the gap in the position at which the light is incident. In other words, the dispersion in the size of the gap between the pair of reflecting films is generated in the wavelength variable interference filter. In this case, the wavelength of the transmitted light is changed depending on the position at which the light is incident. In contrast, in the application example, the size of the gap corresponding to each of the pixels in the position at which the light is incident is accurately grasped by, for example, scanning the dispersion in the size of the gap in manufacturing. Then, the central wavelength of the light which is received in the pixel considering the dispersion in the size of the gap as described above is acquired. With this, it is possible to image the spectroscopic image with high accuracy.

In the spectroscopic imaging apparatus according to the application example, it is preferable to include a measurement control unit that causes the gap changing unit to sequentially change the size of the gap between the pair of reflecting films and an image generating unit that generates a spectroscopic image corresponding to a target wavelength based on an amount of the light of the target wavelength, which is received in each of the plurality of pixels.

In this application example, the amount of light in each of the pixels is acquired by sequentially changing the size of the gap through the measurement control unit. At the same time, the size of the gap is sequentially changed so as to acquire the amount of light in each of the pixels (an image pixel) of the spectroscopic image of the target wavelength. In addition, the image generating unit generates the spectroscopic image based on the amount of light of the target wavelength which is received in each of the pixels. For example, in a case where the light of the target wavelength λ is received in a pixel A (corresponding to an image pixel Pa in the captured image) with a size of the gap Ga, and the light of the target wavelength λ is received in a pixel B (corresponding to an image pixel Pb in the captured image) with a size of the gap Gb, the size of the gap is sequentially changed to Ga and Gb. Then, an amount of received light in the pixel A is set to a value of an image pixel Pa when the size of the gap is Ga, and a amount of received light in the pixel B is set to a value of an image pixel Pb when the size of the gap is Gb, thereby compositing the spectroscopic image.

With this, it is possible to composite the spectroscopic images in which the amount of light of a desired target wavelength is set to a pixel value (for example, a brightness value) of each image pixel. In addition, in the application example, the size of the gap at which the light of the target wavelength can be received in each of the pixels is sequentially changed, and thus it is possible to generate the spectroscopic image of the target wavelength by acquiring only the amount of received light in the corresponding pixel.

In the spectroscopic imaging apparatus according to application example, it is preferable to include a spectrum calculation unit that measures an optical spectrum of the light which is received in each of the plurality of pixels.

In this application example, the size of the gap with respect to a predetermined wavelength zone is scanned by the measurement control unit, and the optical spectrum of the light which is received in each of the pixels is calculated by the spectrum calculation unit based on the amount of received light in each of the pixels with respect to the wavelength. With such a configuration, it is possible to acquire the accurate optical spectrum in each image pixel corresponding to each of the pixels.

In the spectroscopic imaging apparatus according to application example, it is preferable that the image generating unit generates a spectroscopic image corresponding to the target wavelength by acquiring the amount of light corresponding to the light of the target wavelength, which is received in the plurality of pixels, based on the optical spectrum of the light received in each of the plurality of pixels.

In this application example, the spectroscopic image is generated based on the optical spectrum in each image pixel corresponding to each of the pixels measured as in the above-described invention. That is, the amount of light of a desired target wavelength is detected from the optical spectrum of each image pixel, and the spectroscopic image of the target wavelength is generated based on the detected amount of light. In this case, in a case where there is a plurality of the acquired spectroscopic images (in a case where there is a plurality of the target wavelengths), or a case where the target wavelength is set after performing an imaging operation, it is possible to easily acquire the spectroscopic image of a desired target wavelength without repeatedly performing the imaging operation.

In the spectroscopic imaging apparatus according to the application example, it is preferable to include a filter unit that includes the wavelength variable interference filter and an imaging body that includes the imaging unit and the received-light wavelength acquiring unit, in which the filter unit is detachably mounted on the imaging body.

In this application example, the filter unit is detachably mounted on the imaging body. With such a configuration, it is possible to replace the imaging body with another imaging body including various functions. Accordingly, it is possible to easily acquire the spectroscopic image by mounting only the filter unit on the existing imaging body.

According to this application example, there is provided a spectroscopic imaging method in a spectroscopic imaging apparatus which includes an imaging unit that includes a plurality of pixels, and receives light guided by a light condensing unit, and a wavelength variable interference filter that includes a pair of reflecting films and a gap changing unit which is able to change a size of the gap between the pair of reflecting films, and is disposed on an optical path of the light incident on the imaging unit, the method comprising acquiring a central wavelength based on an incidence angle in a position where the light which is received in each of the plurality of pixels which is incident to one among the pair of reflecting films, sequentially changing a size of the gap between the pair of reflecting films, and generating a spectroscopic image corresponding to a target wavelength based on an amount of the light of the target wavelength, which is received in each of the plurality of pixels.

In this application example, similar to the above-described invention, with respect to each of the pixels, the central wavelength is acquired based on the size of the gap between the pair of reflecting films and the incidence angle of the light which is incident on the reflecting film. Then, the size of the gap is sequentially changed so as to receive the light of the target wavelength in each of the pixels, and the spectroscopic image is generated based on the light of the target wavelength which is received in each of the pixels. In the spectroscopic imaging method, similar to the above-described invention, it is not necessary to provide an optical member for setting the incidence angle of the incident light in the prestage of the wavelength variable interference filter, and thus it is possible to reduce the size of the apparatus. In addition, since it is possible to acquire the central wavelength of the light which is received in each of the pixels a spectroscopic image having high accuracy can be acquired.

BRIEF DESCRIPTION OF THE DRAWINGS

The invention will be described with reference to the accompanying drawings, wherein like numbers reference like elements.

FIG. 10 is a diagram illustrating an example of table data in a third embodiment.

DESCRIPTION OF EXEMPLARY EMBODIMENTS

First Embodiment

Hereinafter, the first embodiment according to the invention will be described with reference to the drawings.

Schematic Configuration of Spectroscopic Camera

Figure 1:
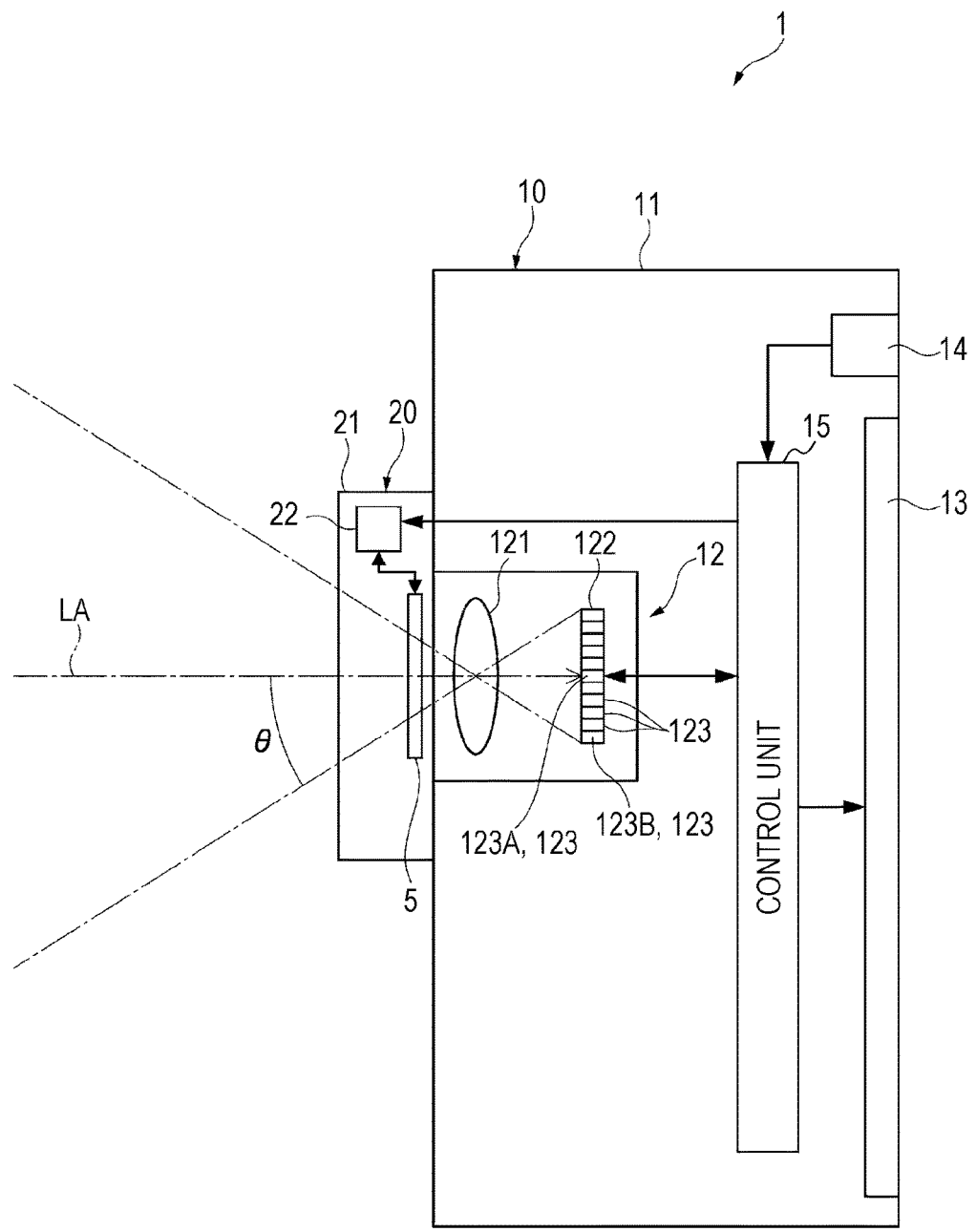
FIG. 1 is a schematic diagram illustrating a schematic configuration of a spectroscopic camera according to a first embodiment of the present invention.
Figure 2:
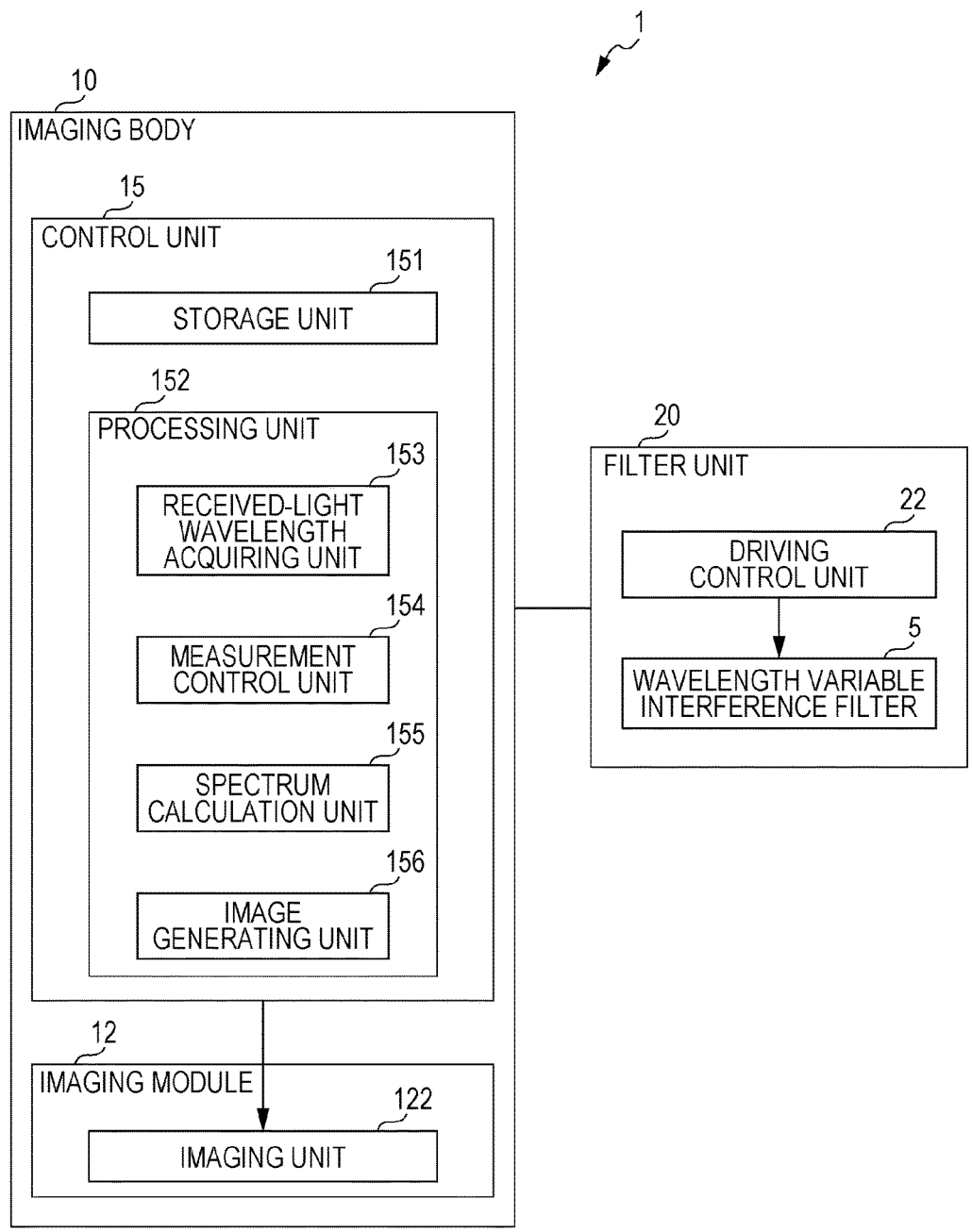
FIG. 2 is a block diagram illustrating a schematic configuration of the spectroscopic camera in the first embodiment.

FIG. 1 is a schematic diagram illustrating a schematic configuration of a spectroscopic camera according to the first embodiment of the present invention. FIG. 2 is a block diagram illustrating a schematic configuration of the spectroscopic camera.

A spectroscopic camera 1 corresponds to a spectroscopic imaging apparatus of the invention and is an apparatus for imaging a spectroscopic image of an imaging target.

The spectroscopic camera 1 of the embodiment is, as illustrated in FIG. 1, provided with an imaging body 10 and a filter unit 20 which is detachably formed on the imaging body 10.

Configuration of Imaging Body

The imaging body 10, as illustrated in FIG. 1, is provided with an exterior housing 11, an imaging module 12, a display 13, an operation unit 14, and a control unit 15. As the imaging body 10, a variety of existing devices including a camera function, for example, a smart phone, a tablet terminal, or a digital camera, can be used.

The exterior housing 11 accommodates the respective members forming the imaging body 10. In addition, a filter unit 20 is detachably provided on the exterior housing 11. The filter unit 20 can be detachably mounted on the exterior housing 11 in such a manner that an engagement part such as a hook is provided on the exterior housing 11, and the engagement part is engaged with a locking part which is provided in the filter unit 20. In addition, a configuration of a cover member in which the filter unit 20 that is provided fits into the exterior housing 11 may be employed.

Configuration of Imaging Module

The imaging module 12 acquires an image by receiving the incident light in response to the control of the control unit 15. The imaging module 12 is provided with a condensing lens 121 (a light condensing unit) and an imaging unit 122 which receives the incident light.

The condensing lens 121 image-forms the light (an image of a target) incident from an incidence window which is provided on the imaging body 10 in the imaging unit 122. Meanwhile, a single condensing lens 121 is illustrated in FIG. 1, but a plurality of lenses may be combined. A field angle θ of an image captured by the imaging unit 122 is determined by the condensing lens 121.

The imaging unit 122 can use, for example, an image sensor such as a CCD or a CMOS. The imaging unit 122 includes a two-dimensional array structure in which pixels 123 which correspond to a position of each pixel (an image pixel) of the captured image are disposed in a matrix shape. Then, the imaging unit 122 outputs an image (an image signal) in which an amount of light received in each of the pixels 123 is set to an amount of light of each image pixel to the control unit 15.

Here, in the embodiment, the pixel 123 which is positioned in the middle of the two-dimensional array structure is referred to as the center pixel 123A. This center pixel 123A detects the amount of light of a center image pixel in the captured image. In addition, the pixel 123 which is disposed at the outermost periphery of the two-dimensional array structure is referred to as a peripheral pixel 123B. This peripheral pixel 123B detects the amount of light of the image pixel of an outermost peripheral portion in the captured image.

Configuration of Display

The display 13 is provided to face a display window of the exterior housing 11. As the display 13, any component may be employed as long as it is configured to display an image, and can be for example, a liquid crystal panel or an organic EL panel.

In addition, the display 13 of the embodiment is provided with a touch panel, and the touch panel may be one of the operation units 14.

Configuration of Operation Unit

The operation unit 14, as described above, is formed of a shutter button which is provided on the exterior housing 11, the touch panel which is provided on the display 13, and the like. When an input operation is performed by a user, the operation unit 14 outputs an operation signal in accordance with the input operation to the control unit 15. Meanwhile, the operation unit 14 is not limited to the above described configuration, and for example, a plurality of operation buttons may be provided instead of the touch panel.

Configuration of Control Unit

The control unit 15 is formed by combining, for example, an operation circuit such as a CPU, and a storage circuit such as a memory, and controls the entire operation of a spectroscopic camera 1. The control unit 15 is provided with, as illustrated in FIG. 2, a storage unit 151, and a processing unit 152. A variety of items of data or programs for controlling the spectroscopic camera 1 are recorded in the storage unit 151.

As the variety of items of data stored in the storage unit 151, for example, there is V-λ, data which records a wavelength of light which is transmitted to a center point O (refer to FIG. 3) of the wavelength variable interference filter 5 and is received in the pixel 123A disposed in the middle of the array in the imaging unit 122, with respect to a voltage applied to an electrostatic actuator 56 of a wavelength variable interference filter 5 described later. In addition, the distance from the condensing lens 121 to the imaging unit 122 in the imaging body 10, and the distance from the middle of the array of each of the pixels 123 in the imaging unit 122 are stored in the storage unit 151.

Further, as the variety of programs, for example, there are a spectroscopic imaging program, and an optical spectrum measuring program. As the imaging body 10, in a case where a configuration which is communicable with a sever device through a network such as a smart phone or tablet terminal is used, it is possible to acquire these programs by downloading the programs from the sever device.

The processing unit 152 reads and executes the variety of programs stored in the storage unit 151, and as illustrated in FIG. 2, functions as the received-light wavelength acquiring unit 153, the measurement control unit 154, the spectrum calculation unit 155, and the image generating unit 156.

The received-light wavelength acquiring unit 153 acquires the central wavelength of the light which is received in each of the pixels 123 in the imaging unit 122.

The measurement control unit 154 controls the filter unit 20 and the imaging unit 122, adjusts the wavelength of the light in each of the pixels 123, and then acquires an amount of light thereof.

The spectrum calculation unit 155 calculates the optical spectrum in each image pixel forming a captured image based on the amount of light acquired in each of the pixels 123.

The image generating unit 156 generates a spectroscopic image having a desired target wavelength.

Respective functional components will be described in detail.

Configuration of Filter Unit

A filter unit 20, as illustrated in FIG. 1, is provided with a filter housing 21, a wavelength variable interference filter 5, and a driving control unit 22. The wavelength variable interference filter 5 and the driving control unit 22 are stored in the filter housing 21. In addition, the filter housing 21 is detachably mounted on the exterior housing 11 of the imaging body 10.

Configuration of Wavelength Variable Interference Filter

Figure 3:
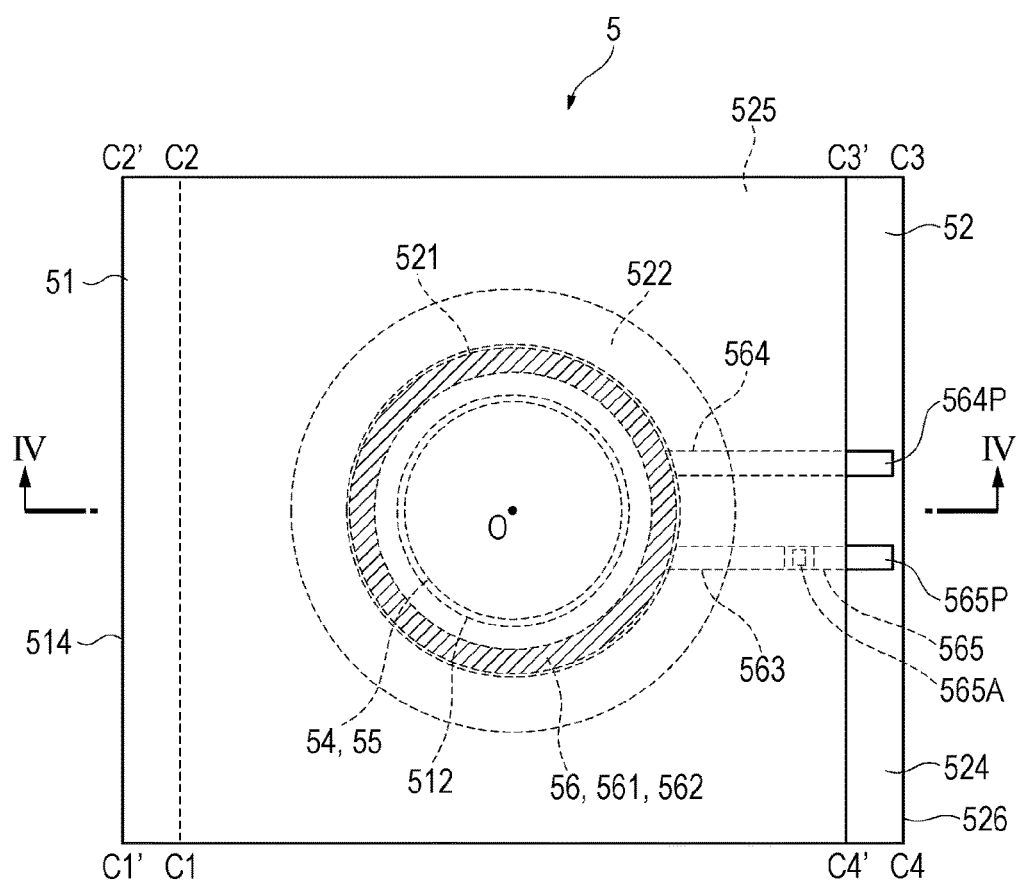
FIG. 3 is a plan view illustrating a schematic configuration of a wavelength variable interference filter in the first embodiment.
Figure 4:
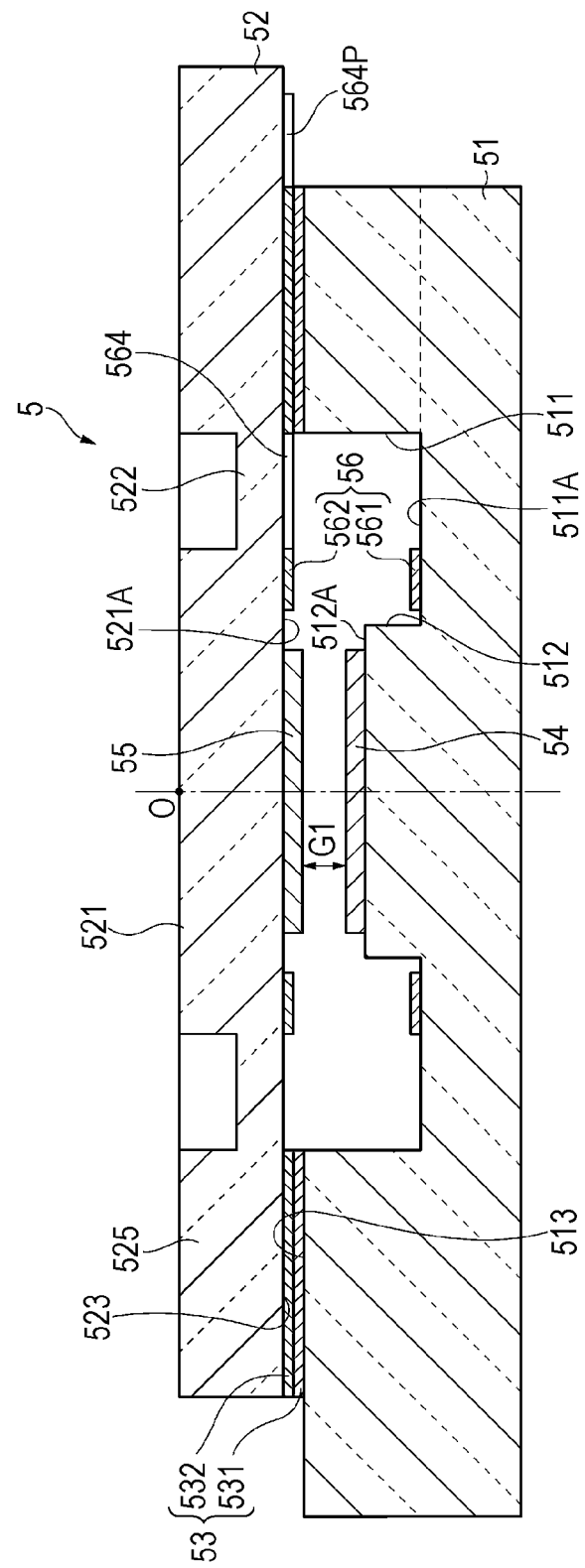
FIG. 4 is sectional view of the wavelength variable interference filter taken along line IV-IV of FIG. 3.

FIG. 3 is a plan view illustrating a schematic configuration of a wavelength variable interference filter 5. FIG. 4 is sectional view of the wavelength variable interference filter 5 taken along line IV-IV of FIG. 3.

The wavelength variable interference filter 5, as illustrated in FIG. 3 and FIG. 4, is provided with a fixed substrate 51 and a movable substrate 52. The fixed substrate 51 and the movable substrate 52 are formed of, for example, various types of glass or liquid crystal, but are formed of quartz glass in the embodiment. Then, these substrates 51 and 52 are integrally formed by being bonded by a bonding film 53 (a first bonding film 531 and a second bonding film 532), as illustrated in FIG. 4. Specifically, a first bonding portion 513 of the fixed substrate 51 and a second boding portion 523 of the movable substrate 52 are bonded by the bonding film 53 which is formed of, for example, a plasma polymerization film containing siloxane as a main component.

Here, in the following description, a plan view seen from a substrate thickness direction of the fixed substrate 51 or the movable substrate 52, that is, a plan view of the wavelength variable interference filter 5 seen from the stacking direction of the fixed substrate 51, the bonding film 53, and the movable substrate 52 is referred to as a plan view of the filter.

As illustrated in FIG. 4, a fixed reflecting film forming one among the pair of reflecting films of the invention is provided on the fixed substrate 51. In addition, the movable reflecting film 55 forming the other one among the pair of reflecting films of the invention is provided on a movable substrate 52. The fixed reflecting film 54 and movable reflecting film 55 are disposed to face each other via a gap G1 between the reflecting films.

In addition, an electrostatic actuator 56 which is used to adjust the distance (a size of the gap) of the gap G1 between the reflecting films 54 and 55 is provided in the wavelength variable interference filter 5. The electrostatic actuator 56 is provided with a fixed electrode 561 provided on the fixed substrate 51 and a movable electrode 562 provided on the movable substrate 52, and the electrodes 561 and 562 are disposed to face each other. The fixed electrode 561 and movable electrode 562 face each other via the gap between the electrodes. Here, these electrodes 561 and 562 may be directly provided on the substrate surface of each of the fixed substrate 51 and the movable substrate 52, or may be provided via other film members.

Meanwhile, in the embodiment, the gap G1 between the reflecting films is formed to be smaller than the gap between the electrodes, but, for example, depending on the wavelength zone which is transmitted by the wavelength variable interference filter 5, the gap G1 between the reflecting films may be formed to be larger than the gap between the electrodes.

In addition, in a plan view of the filter, one side of the movable substrate 52 (for example, a side of C3-C4 in FIG. 3) protrudes outside farther than a side of C3'-C4' of the fixed substrate 51. A protruding part of the movable substrate 52 is the electric unit 526 which is not bonded to the fixed substrate 51, and a surface exposed when the wavelength variable interference filter 5 is seen from the fixed substrate 51 side is an electric surface 524 on which electrode pads 564P and 565P described later are provided.

Similarly, in a plan view of the filter, one side of the fixed substrate 51 (the side opposite to the electric unit 526) protrudes outside farther than the movable substrate 52. This protruding part of the fixed substrate 51, for example, corresponds to a positioning unit 514 when the wavelength variable interference filter 5 is fixed in a package housing or the like.

Configuration of Fixed Substrate

An electrode disposition groove 511 and a reflecting film installation portion 512 are formed by being etched on the fixed substrate 51. The fixed substrate 51 is not bent by an electrostatic attractive force generated when the voltage is applied between the fixed electrode 561 and the movable electrode 562, or by internal stress of the fixed electrode 561.

The electrode disposition groove 511 is, in a plan view of the filter, formed into a circular shape centering on the filter center point O of the fixed substrate 51. The reflecting film installation portion 512 is, in the plan view, formed to protrude from the center portion of the electrode disposition groove 511 to the movable substrate 52 side. A groove bottom surface of the electrode disposition groove 511 corresponds to an electrode installation surface 511A on which the fixed electrode 561 is disposed. In addition, a projecting tip surface of the reflecting film installation portion 512 corresponds to the reflecting film installation surface 512A.

The fixed electrode 561 forming the electrostatic actuator 56 is provided on the electrode installation surface 511A. The fixed electrode 561 is provided in an area which faces the movable electrode 562 of a movable portion 521 described later, in the electrode installation surface 511A. In addition, insulation films may be stacked on the fixed electrode 561 so as to ensure insulation properties between the fixed electrode 561 and the movable electrode 562.

In addition, a fixed extraction electrode 563 which is connected to the outer periphery of the fixed electrode 561 is provided on the fixed substrate 51. The fixed extraction electrode 563 is provided along a connection electrode groove (not shown) which is formed toward one side C3'-C4' (the electric unit 526 side) from the electrode disposition groove 511. A bump 565A which protrudes toward the movable substrate 52 is provided in the connection electrode groove, and the fixed extraction electrode 563 extends onto the bump 565A. Then, the fixed extraction electrode 563 comes in contact with a fixed connection electrode 565 which is provided on the movable substrate 52 side on the bump 565A to be electrically connected. The fixed connection electrode 565 extends to the electric surface 524 from an area facing the connection electrode groove so as to form a fixed electrode pad 565P in the electric surface 524.

Meanwhile, one fixed electrode 561 is provided on the electrode installation surface 511A in the embodiment, but, for example, a configuration in which two electrodes which become a concentric circle centering the filter center point O may be employed (a double-electrode configuration). A configuration in which a translucent electrode is provided on the fixed reflecting film 54 may be employed, or the connection electrode may be formed in an electric unit on the fixing side from the fixed reflecting film 54 by using the conductive fixed reflecting film 54, in this case, as the fixed electrode 561, and a part thereof may be cutoff depending on the position of the connection electrode.

As described above, on the same axis as that of the electrode disposition groove 511, the reflecting film installation portion 512 is formed into a substantially cylindrical shape which becomes a diameter size smaller than the electrode disposition groove 511, and is provided with a reflecting film installation surface 512A facing the movable substrate 52 of the reflecting film installation portion 512.

As illustrated in FIG. 4, the fixed reflecting film 54 is installed in the reflecting film installation portion 512. As the fixed reflecting film 54, for example, a metal film such as Ag, or an alloy film such as a Ag alloy can be used. In addition, for example, a dielectric multilayer film having a high refractive index such as $TiO_2$, and a low refractive index such as $SiO_2$ may be used. Furthermore, a reflecting film on which the metal films (or the alloy film) are stacked with each other on the dielectric multilayer film, a reflecting film on which the dielectric multilayer films are stacked with each other on the metal film (or the alloy film), and a reflecting film on which a single refractive layer ($TiO_2$ or $SiO_2$ or the like), and the metal film (or the alloy film) are stacked with each other.

In addition, in the light incidence surface of the fixed substrate 51 (a surface on which the fixed reflecting film 54 is not provided), an anti-reflection film may be formed in the position corresponding to the fixed reflecting film 54. The anti-reflection film can be formed by alternately stacking a low refractive index film and a high refractive index film, and thus reflectance of visible light on the surface of the fixed substrate 51 is reduced, thereby increasing transmittance thereof.

Then, in the surface of the fixed substrate 51 facing the movable substrate 52, a surface which does not have the electrode disposition groove 511, the reflecting film installation portion 512, and the connection electrode groove formed thereon by etching, forms the first bonding portion 513. The first bonding film 531 is provided in the first bonding portion 513, and the first bonding film 531 is bonded to the second bonding film 532 which is provided on the movable substrate 52, and therefore, the fixed substrate 51 and the movable substrate 52 are bonded to each other, as described above.

Configuration of Movable Substrate

The movable substrate 52 is provided with a movable portion 521 which is formed into a circular shape centering the filter center point O, and a holding unit 522 which is on the same axis as that of the movable portion 521 and holds the movable portion 521.

The thickness of the movable portion 521 is formed to be larger than that of the holding unit 522. The movable portion 521 is formed to have a diameter size larger than at least the diameter size of the peripheral edge of the reflecting film installation surface 512A, in a plan view of the filter. In addition, the movable electrode 562 and the movable reflecting film 55 are provided in the movable portion 521.

Meanwhile, similar to the fixed substrate 51, an anti-reflection film may be formed on the surface of the movable portion 521 on the side opposite to the fixed substrate 51. Such an anti-reflection film can be formed by alternately stacking the low refractive index film and the high refractive index film, and thus reflectance of visible light on the surface of the movable substrate 52 is reduced, thereby increasing transmittance thereof.

The movable electrode 562 faces the fixed electrode 561 via a predetermined gap between the electrodes, and is formed into a circular shape which is the same as that of the fixed electrode 561. The movable electrode 562 and the fixed electrode 561 form the electrostatic actuator 56. In addition, a movable connection electrode 564 which is connected to the peripheral edge of the movable electrode 562 is provided on the movable substrate 52. The movable connection electrode 564 is provided over the electric surface 524 along the position facing the connection electrode groove (not shown) provided on the fixed substrate 51 from the movable portion 521, and a movable electrode pad 564P which is electrically connected to an inside terminal portion is formed on the electric surface 524.

In addition, as described above, the fixed connection electrode 565 is provided on the movable substrate 52, and the fixed connection electrode 565 is connected to the fixed extraction electrode 563 via a bump 565A (refer to FIG. 3).

The movable reflecting film 55 is provided in the center portion of the movable surface 521A of the movable portion 521 so as to face the fixed reflecting film 54 via the gap G1. As the movable reflecting film 55, the reflecting film having the same configuration as that of the above described fixed reflecting film 54 can be used.

Note that, in the embodiment, as described above, the gap between the electrodes is larger than the gap G1 between the reflecting films, but is not limited thereto. Depending on the wavelength zone of the light to be measured, the size of the gap G1 may be larger than the gap between the electrodes, for example, in a case where an infrared ray and a far infrared ray are used as the light to be measured or the like.

The holding unit 522 is a diaphragm surrounding the periphery of the movable portion 521, and the thickness thereof is smaller than that of the movable portion 521. The holding unit 522 is more likely to be bent compared to the movable portion 521, and can displace the movable portion 521 to the fixed substrate 51 side by using a small electrostatic attractive force. At this time, since the thickness of the movable portion 521 is larger than that of the holding unit 522, and thus the rigidity thereof becomes higher, even in a case where the holding unit 522 is pulled with the electrostatic attractive force to the fixed substrate 51 side, the shape of the movable portion 521 is not changed. Therefore, the movable reflecting film 55 which is provided in the movable portion 521 is not bent, and the fixed reflecting film 54 and the movable reflecting film 55 can constantly maintain the parallel state.

Note that, the holding unit 522 is formed into a diaphragm shape in the embodiment, but is not limited thereto. For example, a beam-like holding unit which is disposed at an equal angle interval is provided centering on the filter center point O.

In the movable substrate 52, an area facing the first bonding portion 513 corresponds to the second boding portion 523. The second boding portion 523 is provided with a second bonding film 532. As described above, the second bonding film 532 is bonded to the first bonding film 531, and thus the fixed substrate 51 and the movable substrate 52 are bonded to each other.

Driving Control Unit

The driving control unit 22 causes a driving voltage to be applied to the electrostatic actuator 56 of the wavelength variable interference filter 5 based on a command signal from the control unit 15. With this, the electrostatic attractive force is generated between the fixed electrode 561 and the movable electrode 562 of the electrostatic actuator 56, and the position of the movable portion 521 is changed to the fixed substrate 51 side. The size of the gap G1 of the wavelength variable interference filter 5 is set to a value corresponding to the target wavelength.

Spectroscopic Imaging Method by Spectroscopic Camera

Next, a spectroscopic imaging method by the above-described spectroscopic camera will be described with reference to the drawings.

Figure 5:
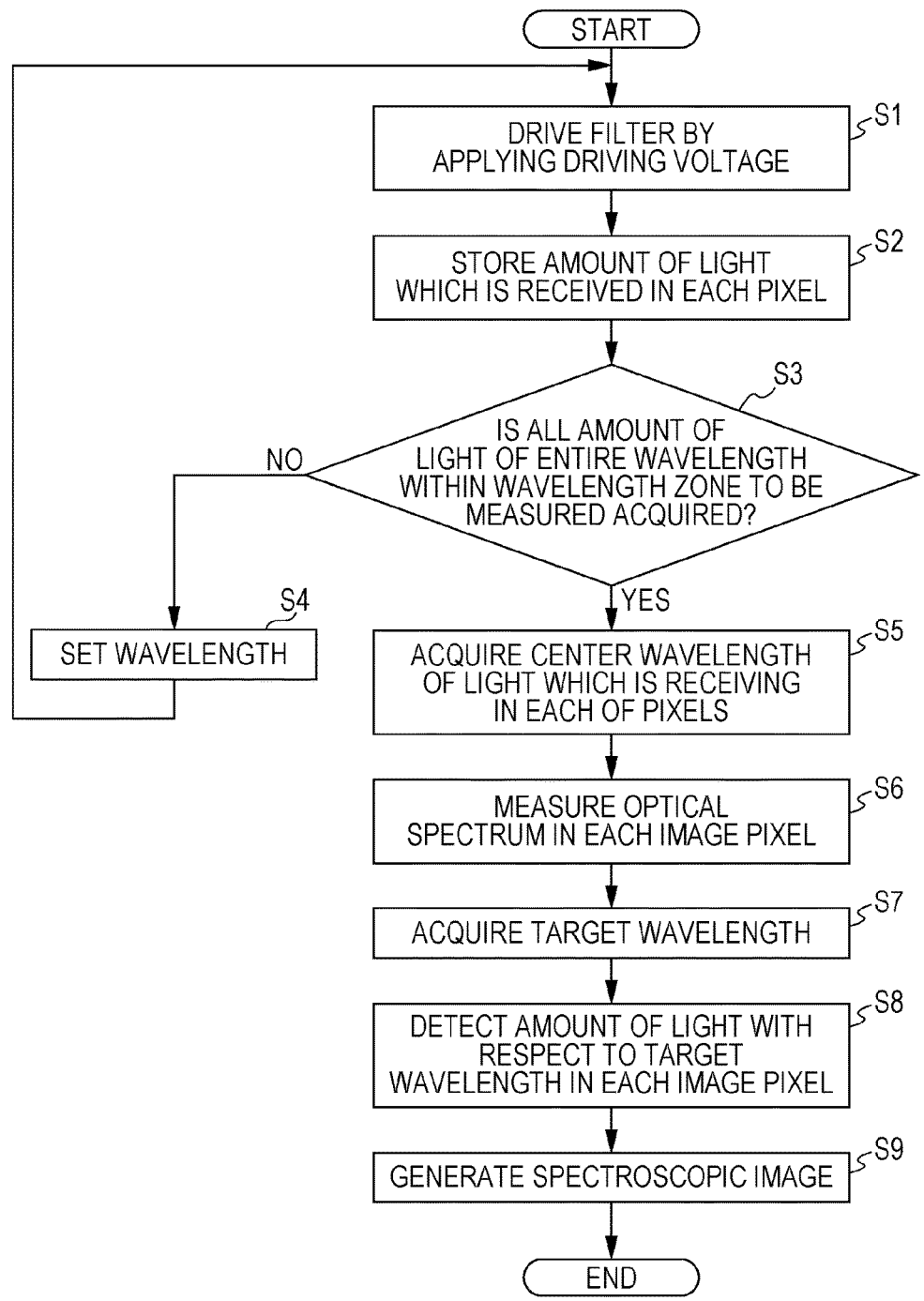
FIG. 5 is a flow chart illustrating a spectroscopic imaging method of using a spectroscopic camera according to the first embodiment.
Figure 6:
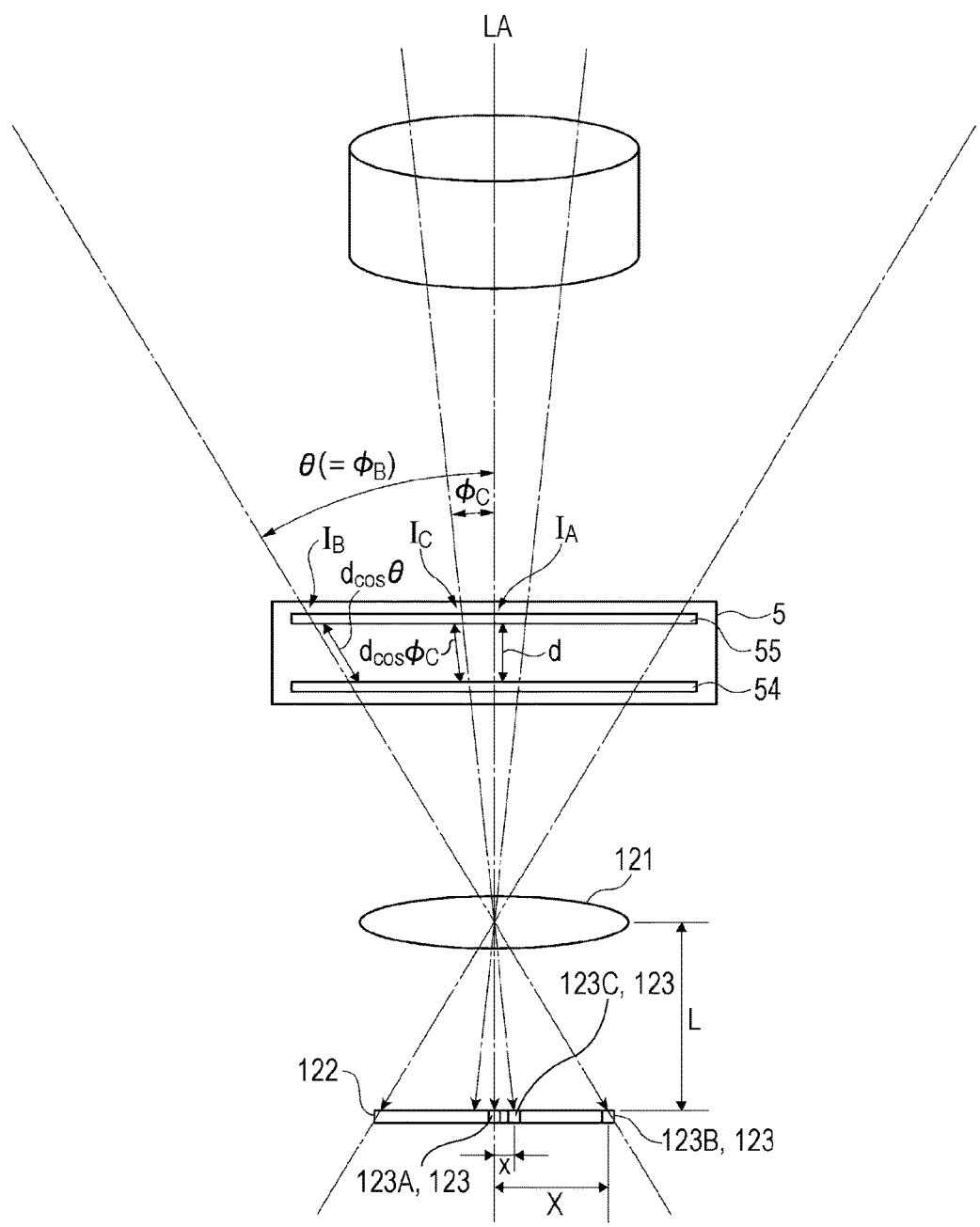
FIG. 6 is a diagram illustrating an optical path of light received in an imaging unit through a wavelength variable interference filter and a condensing lens, in the first embodiment.
Figure 7:
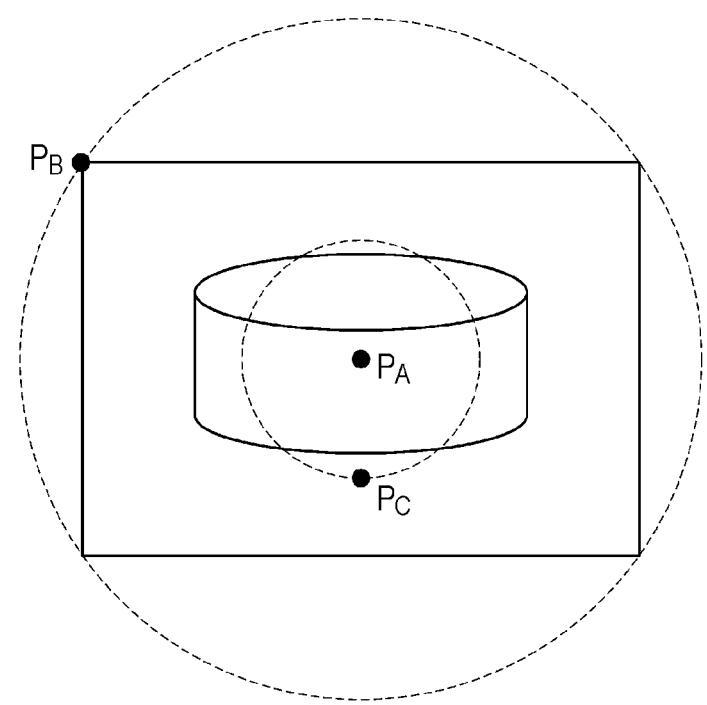
FIG. 7 is a diagram illustrating an example of a captured image imaged by the imaging unit.

FIG. 5 is a flow chart illustrating the spectroscopic imaging method of using the spectroscopic camera according to the embodiment. FIG. 6 is a diagram illustrating an optical path of the light received in the imaging unit 122 through the wavelength variable interference filter 5 and the condensing lens 121, in the embodiment. FIG. 7 is a diagram illustrating an example of a captured image imaged by the imaging unit 122.

In the spectroscopic camera 1 of the embodiment, when an operation of imaging a spectroscopic image is performed by a user, first, the measurement control unit 154 controls the filter unit 20 in such a manner that the wavelength of light which is transmitted to the wavelength variable interference filter 5 is sequentially switched.

Specifically, the measurement control unit 154 sets the driving voltage which is applied to the electrostatic actuator 56 with respect to the wavelength, based on the V-λ, data stored in the storage unit 151, and outputs a command signal for instructing the aforementioned driving voltage to the driving control unit 22 (step S1).

The wavelength with respect to the voltage which is set in step S1 is a wavelength $\lambda_A$ of the light received in a center pixel 123A (refer to FIG. 6) which is disposed in the middle of the pixels 123 disposed in a two-dimensional array structure in the imaging unit 122. In other words, the wavelength $\lambda_A$ is the central wavelength of the light which is incident on the reflecting films 54 and 55 at the incidence angle of 0 degree along a central optical axis LA (an axis passing through the center point O) in the wavelength variable interference filter 5 and is then received in the pixel 123A.

Through step S1, the driving control unit 22 causes the instructed driving voltage to be applied to the electrostatic actuator 56 of the wavelength variable interference filter 5, and the light corresponding to the size of the gap between reflecting films 54 and 55 from the wavelength variable interference filter 5 is transmitted thereto.

Next, the measurement control unit 154 acquires the amount of light received in each of the pixels 123 (for example, the pixels 123A, 123B, and 123C in FIG. 6), and stores the captured image in which the amount of light is set to a pixel value of each image pixel in the storage unit 151 (step S2).

After that, the measurement control unit 154 determines whether or not the amount of light of the entire wavelength in the wavelength zone is to be measured is acquired (step S3). For example, in the embodiment, the wavelength $\lambda_A$ of the light received in the center pixel 123A is scanned per predetermined interval (for example, per 10 nm) in the wavelength zone to be measured.

In step S3, when it is determined to be "No", that is, if there is unmeasured wavelength, the measurement control unit 154 causes the wavelength $\lambda_A$ of the light received in the center pixel 123A to be reduced by a predetermined amount (for example, 10 nm), based on the V-$\lambda$, data, and then sets the driving voltage with respect to the wavelength $\lambda_A$ (step S4). The process returns to step S1.

On the other hand, in step S3, when it is determined to be "Yes", the received-light wavelength acquiring unit 153 acquires the central wavelength of the light which is received in each of the pixels 123 in the imaging unit 122 (step S5). In other words, the received-light wavelength acquiring unit 153 associates the central wavelength with the image pixel of the acquired captured image.

More specifically, as illustrated in FIG. 6, the light incident on the imaging body 10 is condensed into a certain pixel 123 of the imaging unit 122 by the condensing lens 121. Accordingly, the light condensed in one pixel 123 (for example, one of the pixels 123A, 123B, and 123C in FIG. 6) corresponds to the light which is transmitted to the vicinity of one light incidence position $I_i$ (for example, one of $I_A$, $I_B$, and $I_C$ in FIG. 6) in the wavelength variable interference filter 5, and an incidence angle $\varphi_i$ also corresponds to a predetermined value in accordance with the light incidence position $I_i$.

For example, the light received in the center pixel 123A is incident on the wavelength variable interference filter 5 at the incidence angle of 0 degree along the central optical axis LA in the light incidence position $I_A$, and is transmitted to the wavelength variable interference filter 5. With this, the amount of light of a center image pixel $P_A$ of the captured image as illustrated in FIG. 7 is detected.

In addition, the light received in a peripheral pixel 123B is incident on the light incidence position $I_B$ at the incidence angle $\theta$, and is transmitted to the wavelength variable interference filter 5. With this, the amount of light of an outermost periphery image pixel $P_B$ of the captured image as illustrated in FIG. 7 is detected. In addition, the incidence angle $\theta$ ($=\varphi_B$) is a range imaged by the imaging module 12, that is, a field angle (a viewing angle), and is stored in the storage unit 151.

Similar to other pixels 123, for example, the light incident on the pixel 123C is incident on the wavelength variable interference filter 5 at the incidence angle $\varphi_C$ in a light incidence position $I_C$, and is transmitted to the wavelength variable interference filter 5.

As described, positions of the wavelength variable interference filter 5 on which the light received in the pixel 123 is incident are different from each other, and respectively have different incidence angles. Therefore, depending on the difference of the incidence angles, the central wavelength of the light which is received in each of the pixels 123 is shifted. When using a refractive index n of a medium between the pair of reflecting films 54 and 55 (for example, air in the embodiment), a size of the gap d between the reflecting films 54 and 55, a degree m (m is a positive integer), and the incidence angle $\varphi_i$ in the incidence position $I_i$ in the wavelength variable interference filter 5, the central wavelength $\lambda_i$ of the light received in the pixel 123 is shown by the following Equation (1).

$$\lambda_i = \frac{2nd}{m}\cos\varphi_i \qquad (1)$$

In addition, the incidence angle $\varphi_i$ is shown as the following Equation (2) based on the distance x between the center pixel 123A and the pixel 123 which is a target and, a focal distance L between the condensing lens 121 and the imaging unit 122.

$$\varphi_i = \tan^{-1}\frac{x}{L} \qquad (2)$$

Accordingly, in step S5, the received-light wavelength acquiring unit 153, first, calculates the incidence angle $\varphi_i$ of the light, which is received in the pixel 123, to the wavelength variable interference filter 5 with respect to the pixel 123 based on Equation (2). Then, the received-light wavelength acquiring unit 153 substitutes the calculated incidence angle $\varphi_i$ for Equation (1), and calculates the central wavelength $\lambda_i$ of the light which is received in the pixel 123. In addition, the received-light wavelength acquiring unit 153 associates the calculated central wavelength $\lambda_i$ with each image pixel $P_i$ corresponding to the pixel 123 and then records the calculated central wavelength $\lambda_i$, in an area such as the storage unit 151.

The received-light wavelength acquiring unit 153 performs the above process with respect to each image pixel (that is, each of the pixels 123) of each captured image acquired when the size of the gap d between reflecting films 54 and 55 is sequentially changed.

Meanwhile, depending on the imaging body 10, the distance L between the condensing lens 121 and the imaging unit 122 may be not clear. Even in this case, if a value of the field angle $\theta$ is clear, it is possible to calculate the distance L through the following Equation (3).

$$L = \frac{X}{\tan\theta} \qquad (3)$$

After performing step S5, the spectrum calculation unit 155 calculates the optical spectrum in each image pixel (step S6). In other words, the spectrum calculation unit 155 calculates the optical spectrum of each image pixel based on the amount of received light (the pixel value in each image pixel) in each of the pixels 123 and the central wavelength thereof when the size of the gap d between reflecting films 54 and 55 is sequentially changed. For example, the imaging unit 122 includes 10,000 pixels (100 pixels×100 pixels in a square block), and calculates the optical spectrum of these 10,000 pixels.

Meanwhile, in the embodiment, since a shift amount of the wavelength may be increased based on the difference of the incidence angle $\varphi_i$ in some cases, with respect to each image pixel, there is a possibility that the amount of light within a desired wavelength zone to be measured cannot be acquired. For example, the minimum wavelength of the light which can be received in the peripheral pixel 123B becomes larger with respect to the minimum wavelength of the light which can be received in the center pixel 123A. In such a case, it is preferable that the spectrum calculation unit 155 estimates the optical spectrum. As a method of estimating the optical spectrum, for example, there is a method of generating a measurement spectral matrix in which an amount of light with respect to a plurality of wavelengths to be measured is set to a matrix element, and estimating the optical spectrum of the light to be measured by causing a predetermined transformation matrix to act with respect to the measurement spectral matrix. In this case, a plurality of sample light beams which is a known optical spectrum is measured in advance by the imaging module 12, and a transformation matrix is set in such a manner that the difference between a matrix causing the transformation matrix to act on the measurement spectral matrix which is generated based on the amount of light acquired by the measurement and the known optical spectrum becomes minimized.

Next, the image generating unit 156 acquires the target wavelength of the spectroscopic image to be generated (step S7). In the method of acquiring the target wavelength, for example, the image generating unit 156 may acquire the target wavelength by the operation of the operation unit 14 by the user, or the target wavelength may be set in advance. The frequency of the target wavelengths is not particularly limited.

In addition, the image generating unit 156 acquires the amount of light corresponding to the set target wavelength from the optical spectrum of each image pixel (step S8), and generates the spectroscopic image in which each image pixel is displayed with the amount of light (step S9).

Using the above description, the spectroscopic image of the target wavelength is generated.

Action of Embodiment

In the spectroscopic camera 1 of the embodiment, the received-light wavelength acquiring unit 153 calculates the central wavelength $\lambda_i$ of the light which is received in the pixel 123 based on the incidence angle $\varphi_i$ to the wavelength variable interference filter 5 (the reflecting films 54 and 55) in the incidence position $I_i$.

In such a configuration, when acquiring the spectroscopic image, the voltage applied to the electrostatic actuator 56 is changed to cause the pixel 123 to receive the light having the target wavelength, and thereby generating the spectroscopic image based on the amount of light of the target wavelength. That is, in the related art, the optical member has been provided in the prestage and the poststage of the wavelength variable interference filter 5 so as to limit the incidence angle of the light incident on the wavelength variable interference filter 5 such as an optical fiber plate; however, since this kind of optical member is not necessary any more, it is possible to reduce the size of the spectroscopic camera 1.

In addition, even in a case where the shift amount of wavelength due to the incidence angle $\varphi$ exists, since the wavelength of the light received in each of the pixels 123 can be acquired by the received-light wavelength acquiring unit 153, it is possible to acquire the spectroscopic image having high accuracy considering the shift amount of wavelength.

In the embodiment, the received-light wavelength acquiring unit 153 calculates the central wavelength $\lambda_i$ of the light which is incident on the pixel 123 based on Equations (1) and (2). The distances L and x in the Equation (2) are specific known values of the apparatus, and thus it is possible to easily calculate the incidence angle $\varphi_i$ by a simple trigonometric function. Therefore, it is possible to easily calculate the central wavelength $\lambda_i$ by substituting the calculated incidence angle $\varphi_i$ for Equation (1).

In the embodiment, the distance L is calculated based on Equation (3). Accordingly, even in a case where the distance L is not clear, as long as the field angle $\theta$ and the size of the imaging unit 122 are known, it is possible to easily calculate the distance L by using the simple trigonometric function. As a result, similar to the above description, it is possible to easily calculate the central wavelength of the light which is incident on the pixel 123.

In the embodiment, the size of the gap between reflecting films 54 and 55 is scanned by the measurement control unit 154, and the optical spectrum of each image pixel is measured by the spectrum calculation unit 155. Then, the image generating unit 156 generates an image by detecting the amount of light of a desired target wavelength of each image pixel based on the optical spectrum of each image pixel. With this, it is possible to generate the spectroscopic image that indicates the amount of light of the target wavelength with high accuracy in each image pixel.

Further, by measuring the optical spectrum, it is possible to set the target wavelength of the spectroscopic image to be acquired after capturing an image, and to generate each of the spectroscopic images with respect to a plurality of wavelengths.

In the embodiment, the filter unit 20 is detachably mounted to the imaging body 10. As the imaging body 10, an existing apparatus including the imaging module 12 can be used. That is, the filter unit 20 is mounted to the existing smart phone or tablet terminal with a camera function which is not provided with a function of imaging the spectroscopic image. Then, a spectroscopic imaging program or a spectral wavelength acquiring program for causing the control unit 15 (a computer) on the imaging body side to function as the received-light wavelength acquiring unit 153, the measurement control unit 154, the spectrum calculation unit 155, and the image generating unit 156 is installed. With this, the existing imaging body 10 can be set to be the spectroscopic camera 1 which can image the spectroscopic image, and thus it is possible to realize a cost reduction.

Second Embodiment

Next, the second embodiment of the invention will be described with reference to the drawings.

In the first embodiment, the received-light wavelength acquiring unit 153 associates the wavelength based on the incidence angle to the reflecting films 54 and of the wavelength variable interference filter 5 with each of the pixels 123. In contrast, the second embodiment is different from the first embodiment in that the central wavelength considering the dispersion in the size of the gap between the reflecting films 54 and 55 in the wavelength variable interference filter 5 is associated with each of the pixels 123.

Figure 8:
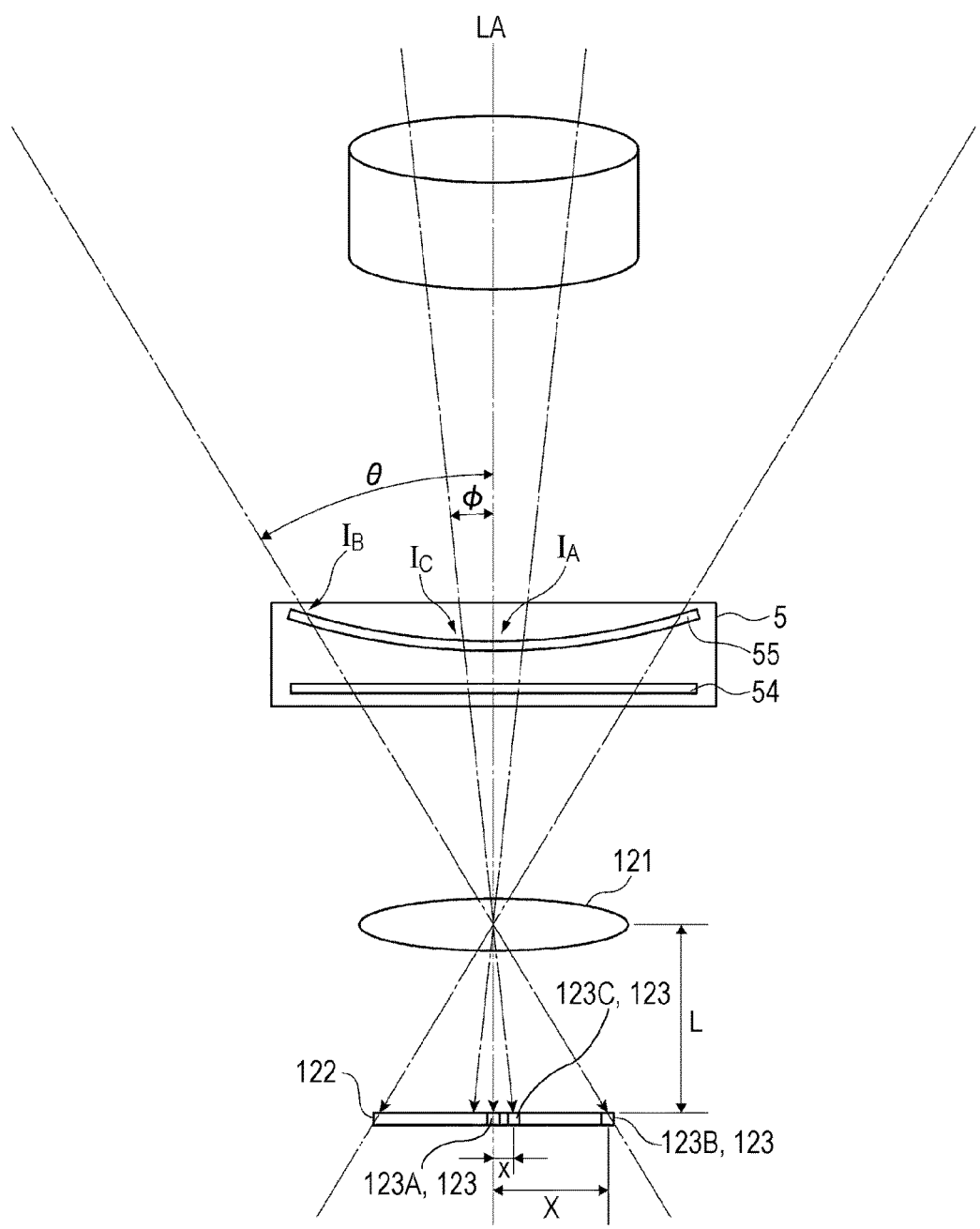
FIG. 8 is a diagram illustrating an optical path of light received in an imaging unit through a wavelength variable interference filter and a condensing lens, in a second embodiment.
Figure 9:
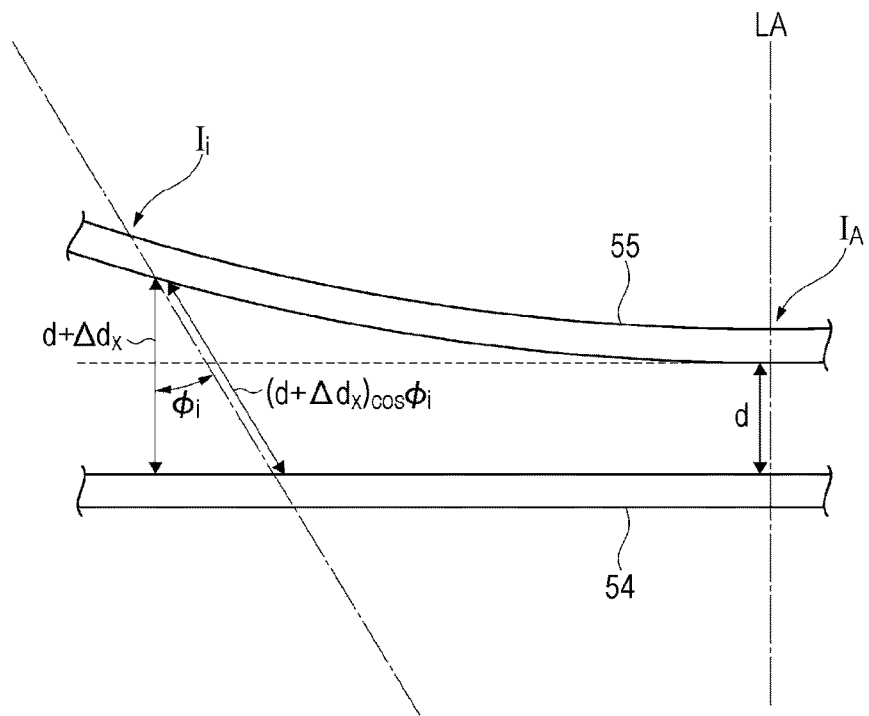
FIG. 9 is an enlarged diagram of the vicinity of a reflecting film in FIG. 8.

FIG. 8 is a diagram illustrating an optical path of light received in the imaging unit 122 through the wavelength variable interference filter 5 and the condensing lens 121, in the second embodiment. FIG. 9 is an enlarged diagram of the vicinity of the reflecting films 54 and 55 in FIG. 8. Note that, in the following description, a constituent element described above is given the same reference numeral, and repeated description thereof will be omitted.

The wavelength variable interference filter 5 bends the holding unit 522 and displaces the movable portion 521 to the fixed substrate 51 side so as to change the size of the gap between the reflecting films 54 and 55. In this case, by bending the holding unit 522, the dispersion in the size of the gap between the reflecting films 54 and 55 is generated. That is, as the optical axis is far from the central optical axis LA (as the reflecting films 54 and 55 extend toward the outer peripheral side) which is the center of the light received in the center pixel 123A, the size of the gap d becomes larger. In addition, the dispersion in the size of the gap may be caused by an inclination of the movable reflecting film 55 due to the dispersion in the size of the gap at the time of manufacturing or the dispersion in the thickness in the holding unit 522.

In contrast, in the received-light wavelength acquiring unit 153 in the embodiment, in addition to the difference of the incidence angles as in the first embodiment, the central wavelength considering the dispersion in the size of the gap between the reflecting films 54 and 55 is associated with each of the pixels 123 as described above.

Specifically, as illustrated in FIGS. 8 and 9, the received-light wavelength acquiring unit 153 first acquires the size of the gap d along the central optical axis LA and a size of the gap $d+\Delta d_x$ in the light incidence position $I_c$ when the size of the gap between reflecting films 54 and 55 is changed.

For example, in the manufacturing of the wavelength variable interference filter 5, a white parallel light beam or the like is incident with respect to the wavelength variable interference filter 5, the dispersion of the central wavelength of the transmitted light is measured, and therefore, the difference of the size of the gap $\Delta d_x$ can be easily calculated using, for example, the above Equation (1). Then, as described above, the difference of the size of the gap $\Delta d_x$ in the light incidence position $I_i$ when the size of the gap d is changed, for example, at a certain interval, is stored in the storage unit 151 as dispersion information related to the gap.

In the embodiment, in step S5 of FIG. 5, the central wavelength $\lambda_i$ of the light which is received from pixel 123 is calculated based on the following Equation (4).

$$\lambda_i = \frac{2n(d + \Delta d_x)}{m} \cos \varphi_i \quad (4)$$

In the embodiment, in the received-light wavelength acquiring unit 153, the central wavelength of the light which is incident on the pixel 123 is calculated based on Equation (4) by considering the dispersion in the size of the gap in the light incidence position in addition to the incidence angle of the light incident on the wavelength variable interference filter 5 in the light incidence position.

For this reason, in the embodiment, it is possible to more accurately calculate the central wavelength of the light which is received in each of the pixels 123, and the spectroscopic image with high accuracy can be generated by the image generating unit 156.

Third Embodiment

Next, the third embodiment according to the invention will be described.

In the above-described first and second embodiments, the received-light wavelength acquiring unit 153 shows an example of calculating the central wavelength of the light which is received in each of the pixels 123 by using Equations (1) to (4).

In contrast, in the third embodiment, the received-light wavelength acquiring unit 153 is differentiated from that in the above-described first and second embodiments in that the central wavelength with respect to each of the pixels 123 is acquired based on LUT (Look Up Table) data (table data) which is stored in the storage unit 151.

FIG. 10 is a diagram illustrating an example of the LUT data stored in the storage unit 151, in the embodiment.

In the embodiment, the pixel 123 is disposed in a two-dimensional array structure, and an image pixel (xm, yl) is structured corresponding to the pixel 123 ($1 \leq m \leq M$, $1 \leq l \leq L$). That is, in the embodiment, the imaging unit 122 can image an image having an M×L image size. In addition, in the wavelength variable interference filter 5, a changeable range of a size of the gap $d_A$ along the central optical axis LA between the reflecting films 54 and 55 is within d1 to dmin.

As illustrated in FIG. 10, the central wavelength $\lambda_{mlj}$ of the light which can be received in each of the pixels 123 with respect to each size of the gap dj is recorded in the spectroscopic camera 1.

Accordingly, in the embodiment, in step S5 in FIG. 5, the received-light wavelength acquiring unit 153 reads out the LUT data as illustrated in FIG. 10, and acquires the central wavelength of the light which is received in each of the pixels 123 corresponding to the size of the gap $d_A$.

With such a configuration, by using Equations (1) to (4) as described above, the process of calculating the central wavelength of the light which is received in each of the pixels 123 is not necessary any more, and thus a processing load is decreased. Therefore, it is possible to realize a process of generating the spectroscopic image more rapidly.

In addition, even in a case where the corresponding size of the gap $d_A$ is not recorded on the LUT data, it is possible to estimate and easily calculate the central wavelength of the light which is received in each of the pixels 123 by performing an interpolating process.

Fourth Embodiment

Next, the fourth embodiment according to the embodiments will be described.

In the first to third embodiments, by performing the processes in step S1 to step S5 in FIG. 5, the size of the gap between reflecting films 54 and 55 is scanned, and thus the optical spectrum of each image pixel is measured in step S6. In contrast, the fourth embodiment is different from the above embodiments in that the spectroscopic image is acquired without measuring the optical spectrum.

Figure 11:
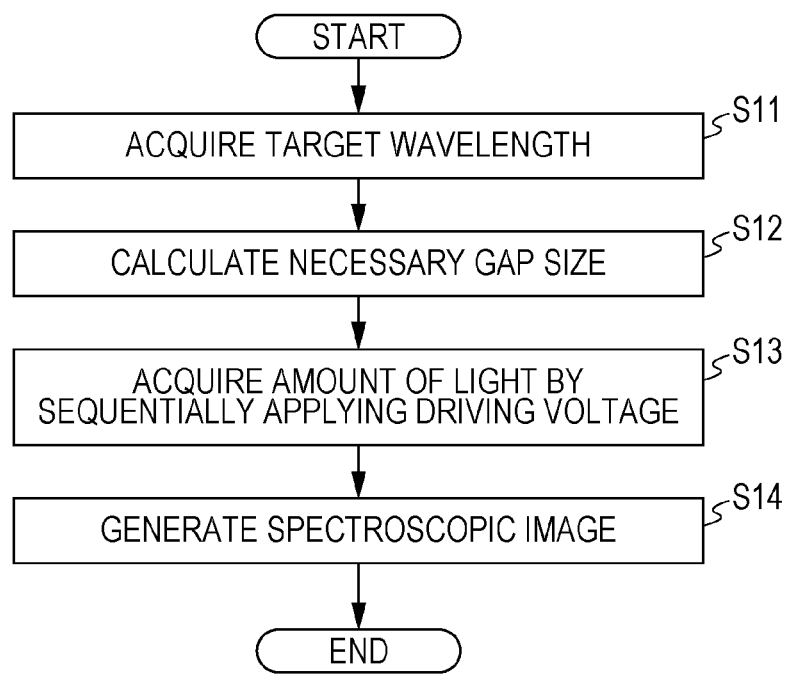
FIG. 11 is a flow chart of a spectroscopic imaging method of a spectroscopic camera in a fourth embodiment.

FIG. 11 is a flow chart of a spectroscopic imaging method of the spectroscopic camera in the embodiment.

As illustrated in FIG. 11, in the embodiment, first, the measurement control unit 154 acquires the target wavelength of the spectroscopic image to be generated (step S11).

After that, the received-light wavelength acquiring unit 153 substitutes the target wavelength and the incidence angle $\varphi_i$ calculated from Equation (2) for the wavelength $\lambda_i$ in Equation (1), and then calculates the size of the gap d which is necessary to acquire the target wavelength for each of the pixels 123 (step S12).

After that, the measurement control unit 154 causes the driving voltage corresponding to the size of the gap calculated in step S12 to be sequentially applied to the electrostatic actuator 56, and then acquires the amount of light detected in the pixel 123 in which the light of the target wavelength is received (step S13).

For example, regarding the size of the gap for receiving the light of target wavelength $\lambda_o$, in a case where a size of the gap $d_A$ in the center image pixel $P_A$ of the captured image (corresponding to the pixel 123A in the imaging unit 122), a size of the gap dc in the image pixel $P_C$ (corresponding to the pixel 123C in the imaging unit 122) which is separated from the center image pixel $P_A$ in the captured image by the distance x, and a size of the gap $d_B$ in an outermost periphery image pixel $P_B$ (corresponding to the pixel 123B in the imaging unit 122) in the captured image are acquired, the size of the gap between reflecting films 54 and 55 is sequentially changed to $d_B$, $d_C$, and $d_A$. Then, in a case where the size of the gap is $d_B$, the light received in the peripheral pixel 123B is acquired as the amount of light of the outermost periphery image pixel $P_B$, in a case where the size of the gap is $d_C$, the light received in the pixel 123C is acquired as the amount of light of the image pixel $P_C$ of the distance x from the center image pixel $P_A$, and in a case where the size of the gap is $d_A$, the light received in the pixel 123A is acquired as the amount of light of the center image pixel $P_A$.

After that, the image generating unit 156 generates a composited image based on the amount of received light detected in each of the pixels 123 in which the light of the target wavelength is received (step S14).

Using the above, the spectroscopic image of the target wavelength is generated.

In the embodiment, the process of acquiring the optical spectrum in each image pixel is not necessary unlike in the first to third embodiments. Accordingly, in a case where the target wavelength of the spectroscopic image to be acquired is already known, it is possible to generate the spectroscopic image more rapidly.

Other Embodiments

Meanwhile, the present invention is not limited to the above described embodiments, and includes modifications and improvements in a scope in which the present invention can be achieved.

The spectroscopic imaging apparatus 1 in the above described embodiments may further include a light source. As the light source, for example, an LED (a white LED, a near infrared LED, or the like), a halogen lamp, and a tungsten lamp can be used.

In this case, in the spectroscopic imaging method as illustrated in FIG. 5, for example, after performing the driving control of the wavelength variable interference filter 5 in step S1, the control unit 15 causes the light source to be turned on, and when it is determined as "Yes" in step S3, the control unit 15 causes the light source to be turned off.

In addition, in the above described example, while the process of acquiring the amount of light with respect to the entire wavelength is completed, the light source is constantly turned on, but the light source may be alternately turned on and off. In this case, for example, the control unit 15 causes the light source to be turned on before performing the driving control of the wavelength variable interference filter 5 in step S1, and causes the light source to be turned off after the amount of light which is received in each of pixels 123 is stored in step S2.

In the above described embodiments, the configuration in which the light which is incident on the spectroscopic imaging apparatus 1 is incident on the imaging unit 122 through the condensing lens 121 from the wavelength variable interference filter 5 is exemplified, but the invention is not limited the aforementioned configuration.

Figure 12:
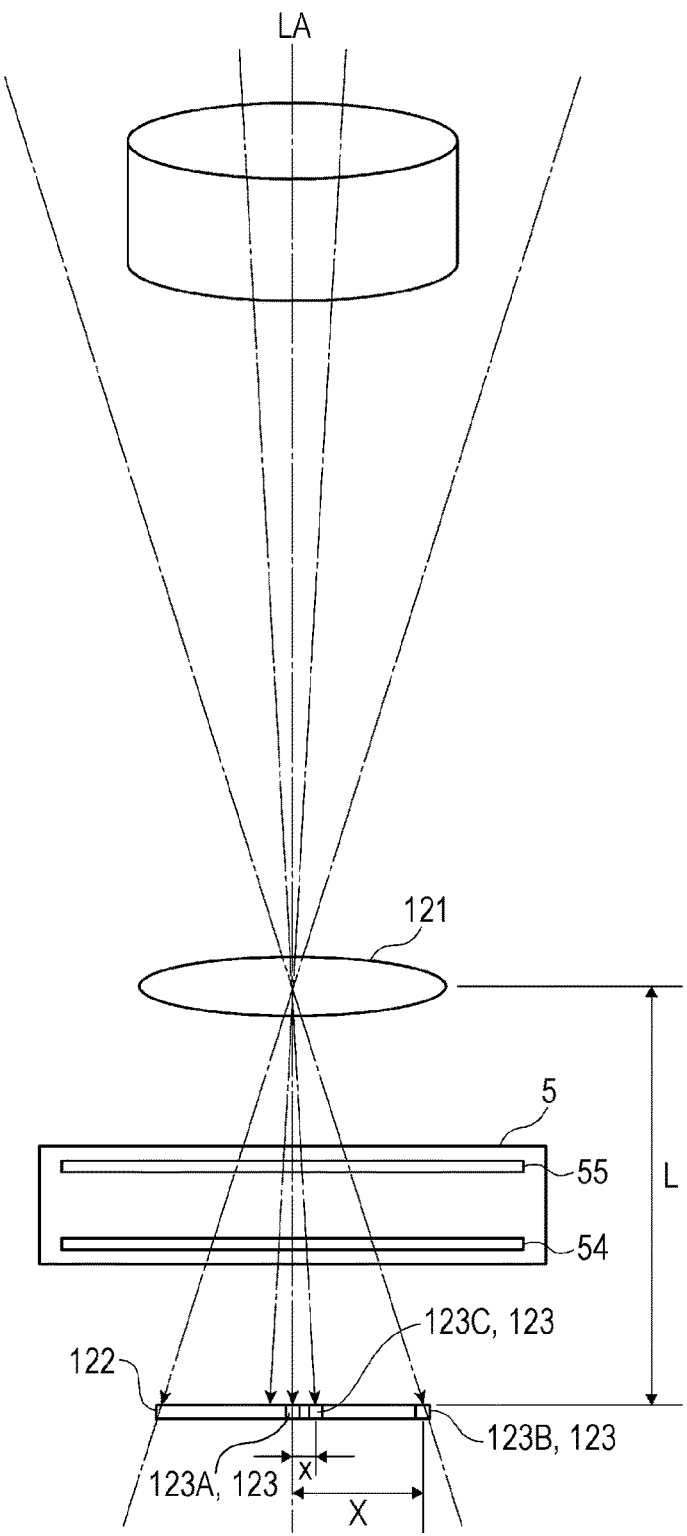
FIG. 12 is a diagram illustrating an optical path of light received in an imaging unit in a modification example of the invention.

For example, as illustrated in FIG. 12, the light may be incident on the imaging unit 122 through the wavelength variable interference filter 5 from the condensing lens 121.

In the above described embodiments, the wavelength variable interference filter 5 as illustrated in FIG. 3 and FIG. 4 is exemplified, but the reflecting films 54 and 55 may also function as an electrode by forming electrode films on the reflecting films 54 and 55. In this case, the size of the gap between reflecting films 54 and 55 can be accurately detected by measuring the capacity, and it is possible to improve the accuracy of gap control by the electrostatic actuator 56, thereby acquiring the spectroscopic image with high accuracy.

In the above described embodiments, the size of the gap between reflecting films 54 and 55 is changed by the electrostatic actuator 56; however, the invention is not limited to the electrostatic actuator 56. For example, an induction actuator in which a first induction coil is disposed instead of the fixed electrode 561, a configuration in which a second induction coil or a permanent magnet is disposed instead of the movable electrode 562 may be used.

In the above described embodiments, the configuration in which the filter unit 20 is detachably mounted to the imaging body 10 is exemplified, but the filter unit 20 may be integrated with the imaging body 10. In this case, as the above-described embodiments, since a particular member for limiting the incidence angle of the light incident on the wavelength variable interference filter is not necessary, the configuration can be simply made, thereby facilitating the reduction of the size of the apparatus.

In the above described embodiments, the central wavelength of the light which is received in each of the pixels 123 is acquired by using the distance L between the condensing lens 121 and the imaging unit 122. Here, there are some cases where the condensing lens 121 is formed of a plurality of lens groups. In such a configuration, for example, it is possible to zoom in or out on the captured image by changing the distance between lenses. In this case, by replacing the focal distance in the lens groups with the distance L, similar to in the above-described embodiments, it is possible to calculate the central wavelength of the light received in each of pixels 123.

A specific structure in the embodiments of the invention can be appropriately changed to other structures in the scope in which the present invention can be achieved.

The entire disclosure of Japanese Patent Application No. 2014-134838 filed on Jun. 30, 2014 is expressly incorporated by reference herein.

What is claimed is:

1. A spectroscopic imaging apparatus comprising:
an imaging unit that includes a plurality of pixels and that receives light guided by a light condensing unit;
a wavelength variable interference filter that includes a pair of reflecting films and a gap changing unit, the gap changing unit being configured to bend one of the pair of reflecting films so as to change a size of the gap between the pair of reflecting films, the wavelength variable interference filter being disposed on an optical path of the light incident on the imaging unit; and
a received-light wavelength acquiring unit that acquires a central wavelength of the light which is incident on each of the plurality of pixels,
wherein the received-light wavelength acquiring unit acquires the central wavelength based on an incidence angle in a position where the light which is received in each of the plurality of pixels is incident to one of the pair of reflecting films, which is bent, and based on a difference of a size of the gap.

2. The spectroscopic imaging apparatus according to claim 1,
wherein the received-light wavelength acquiring unit calculates the central wavelength of the light which is received in a predetermined pixel based on a distance between the imaging unit and the light condensing unit, and a distance between a pixel among the plurality of pixels which is disposed in the middle of the imaging unit and the predetermined pixel among the plurality of pixels.

3. The spectroscopic imaging apparatus according to claim 2,
wherein the received-light wavelength acquiring unit calculates a distance between the imaging unit and the light condensing unit based on the incidence angle corresponding to the light incident on the pixel which is disposed at the outermost periphery of the imaging unit by the light condensing unit, and a distance between the pixel disposed in the middle of the imaging unit and the pixel which is disposed at the outermost periphery of the imaging unit.

4. The spectroscopic imaging apparatus according to claim 1, further comprising:
a storage unit that stores table data in which the central wavelength of the light which is incident on each of the plurality of pixels is recorded so as to correspond to each of a plurality of size of the gaps,
wherein the received-light wavelength acquiring unit acquires the central wavelength of the light which is received in each of the plurality of pixels based on the table data.

5. The spectroscopic imaging apparatus according to claim 1,
wherein the received-light wavelength acquiring unit acquires the central wavelength based on the size of the gap and the incidence angle in a position where the light which is received in each of the plurality of pixels is incident to one of the pair of reflecting films.

6. The spectroscopic imaging apparatus according to claim 1, further comprising:
a measurement control unit that causes the gap changing unit to sequentially change the size of the gap between the pair of reflecting films; and
an image generating unit that generates a spectroscopic image corresponding to a target wavelength based on an amount of the light of the target wavelength, which is received in each of the plurality of pixels.

7. The spectroscopic imaging apparatus according to claim 6, further comprising:
a spectrum calculation unit that calculates an optical spectrum of the light which is received in each of the plurality of pixels.

8. The spectroscopic imaging apparatus according to claim 7,
wherein the image generating unit generates the spectroscopic image corresponding to the target wavelength by acquiring the amount of light corresponding to the light of the target wavelength, which is received in the plurality of pixels, based on the optical spectrum of the light received in each of the plurality of pixels.

9. The spectroscopic imaging apparatus according to claim 1, further comprising:
a filter unit that includes the wavelength variable interference filter; and
an imaging body that includes the imaging unit and the received-light wavelength acquiring unit,
wherein the filter unit is detachably mounted on the imaging body.

10. A spectroscopic imaging method of a spectroscopic imaging apparatus, the spectroscopic imaging apparatus including:
an imaging unit that includes a plurality of pixels and that receives light guided by a light condensing unit; and
a wavelength variable interference filter that includes a pair of reflecting films and a gap changing unit, the gap changing unit being configured to bend one of the pair of reflecting films so as to change a size of a gap between the pair of reflecting films, the wavelength variable interference filter being disposed on an optical path of the light incident on the imaging unit, the method comprising:
bending one of the pair of reflecting films so as to change the size of the gap between the pair of reflecting films;
acquiring a central wavelength based on an incidence angle in a position where the light which is received in each of the plurality of pixels is incident to one of the pair of reflecting films, which is bent, and based on a difference of a size of the gap;
sequentially changing the size of the gap between the pair of reflecting films; and
generating a spectroscopic image corresponding to a target wavelength based on an amount of the light of the target wavelength, which is received in each of the plurality of pixels.

* * * * *